(12) United States Patent
Imai

(10) Patent No.: US 6,305,050 B1
(45) Date of Patent: Oct. 23, 2001

(54) HINGE DEVICE TO BE USED FOR A FOLDABLE APPARATUS

(75) Inventor: Katsuya Imai, Tokyo (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 0 days.

(21) Appl. No.: 09/572,566

(22) Filed: May 16, 2000

(30) Foreign Application Priority Data

May 31, 1999 (JP) ................................................. 11-151708

(51) Int. Cl.$^7$ ....................................................... E05D 11/10
(52) U.S. Cl. ................................ 16/303; 16/304; 16/307; 16/334; 16/344
(58) Field of Search ............................. 16/303, 304, 307, 16/297, 284, 321, 334, 344, 341

(56) References Cited

U.S. PATENT DOCUMENTS

| | | | |
|---|---|---|---|
| 4,645,905 | * | 2/1987 | Ming ................................... 2199/297 |
| 5,600,870 | * | 2/1997 | Fields et al. ............................ 16/342 |
| 5,915,440 | * | 6/1999 | Repo ...................................... 16/330 |
| 6,065,187 | * | 5/2000 | Mischenko ............................. 16/341 |
| 6,070,298 | * | 6/2000 | Sorimachii ............................. 16/330 |
| 6,148,480 | * | 11/2000 | Cooke .................................... 16/303 |

FOREIGN PATENT DOCUMENTS 7-11831    1/1995  (JP) .

* cited by examiner

Primary Examiner—Anthony Knight
Assistant Examiner—Mark Williams
(74) Attorney, Agent, or Firm—Jacobson Holman, PLLC

(57) ABSTRACT

There is provided a hinge device for a foldable apparatus which comprises a first member provided with a first hinge sleeve rigidly secured thereto and with a first abutment peripheral edge and a second member provided with a second hinge sleeve with a second abutment peripheral edge slidably held in abutment with the first abutment peripheral edge; wherein said hinge device further comprises a first disk unrotatably fitted into said first hinge sleeve and a second disk unrotatably fitted into said second hinge sleeve; and either the first abutment facet of the first disk or the second abutment facet of the second disk being provided with a plurality of engaging recesses arranged at predetermined angular positions thereof; the other being provided with a plurality of engaging projections adapted to become engaged with the each engaging recesses under the effect of resilient force of a coil spring, the engagement of said engaging projections and said engaging recesses being switched by an opening or closing motion of the first and second members;

4 Claims, 6 Drawing Sheets

(A)

(C)

(B)

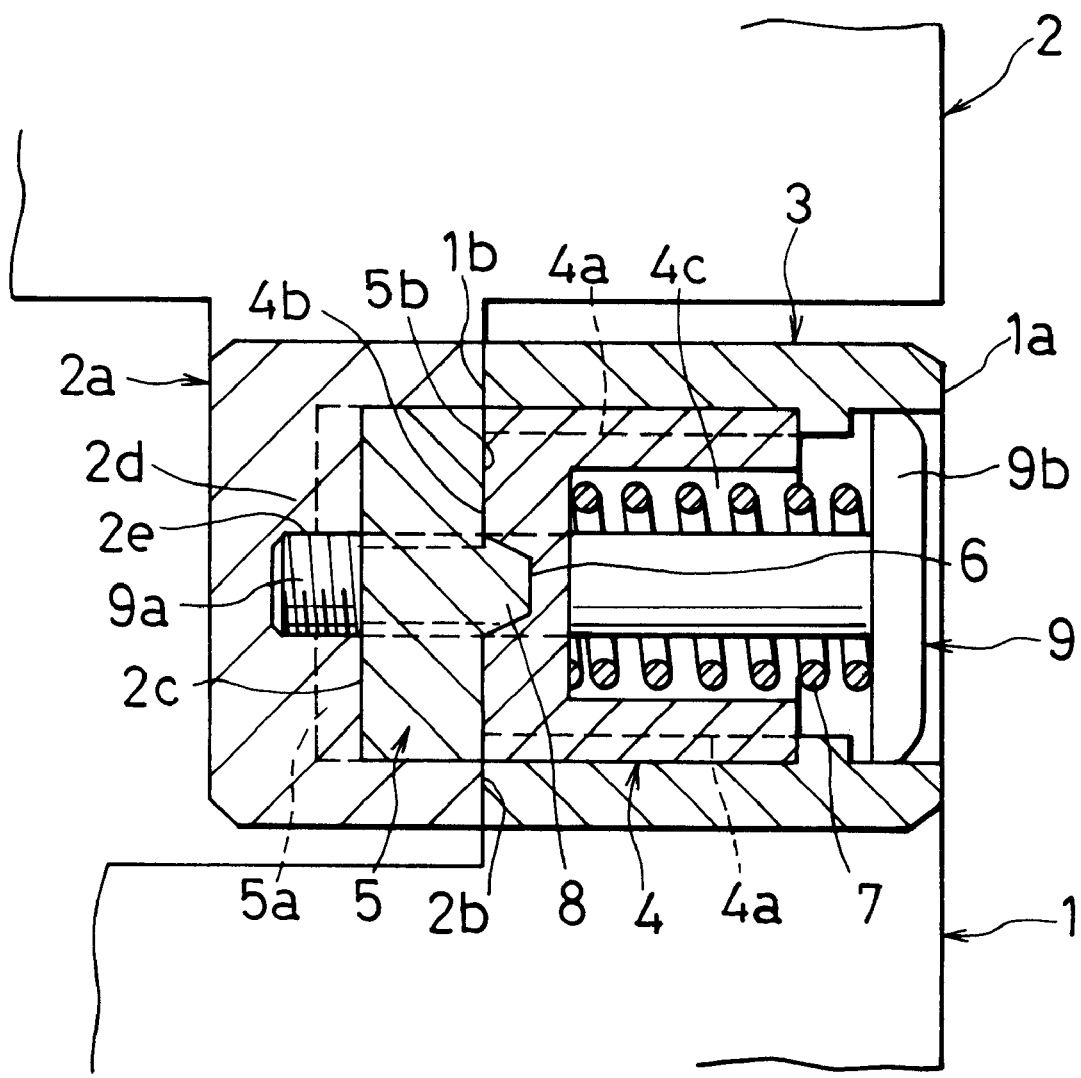

HINGE DEVICE TO BE USED FOR A FOLDABLE APPARATUS

BACKGROUND OF THE INVENTION

1. Field of the Invention

This invention relates to a hinge device to be used for a foldable apparatus comprising an apparatus main body and a cover apparatus such as a lap-top type computer, a portable telephone set or a word processor so as to make the cover rotatably fitted to the main body, said hinge device being adapted to hold the cover to any intermediary angular position relative to the main body between the fully closed position and the fully opened position and release the cover from the intermediary angular position when appropriate force is applied to the cover so that the cover may be opened and closed smoothly.

2. Prior Art

Known lock means including claw clutches and magnets that are adapted to prevent the cover of an apparatus such as a portable telephone set from being inadvertently closed in use or opened when not in use are not satisfactory particularly in terms of limited applicability, high cost and inconvenience of operation. In an attempt for dissolving the drawbacks of the prior art, Japanese Patent Application Laid-Open No. 7-11831 proposes a hinge device as briefly described below.

A hinge device according to the above patent document has a configuration as schematically illustrated in FIGS. 7 through 10 of the accompanying drawings. Referring firstly to FIGS. 7 and 8, an apparatus main body 1 and a corresponding cover 2 are put together by means of the hinge device in such a way that they may be opened relative to each other by an angle of $\alpha°$ and closed from that angular position. The hinge device 3 is constituted by a pair of main body hinge sleeves 1a integrally formed with and secured to the main body 1 and a pair of cover hinge sleeves 2a also integrally formed with and secured to the cover 2 and the abutment facet 1b of each of the main body hinge sleeves 1a and the corresponding abutment facet 2b of the mated one of the cover hinge sleeves 2a slide on each other when the cover is turned open and closed as seen from FIG. 8.

A fixed disk 4 is fitted into each of the main body hinge sleeves 1a in such a way that it cannot rotate but can axially move relative to the hinge sleeve 1a by way of mutual engagement of a guide rib 1c formed on the inner peripheral surface of the main body hinge sleeve 1a and a corresponding guide groove 4a formed on the outer peripheral surface of the fixed disk 4. On the other hand, a movable disk 5 is fitted into each of the cover hinge sleeves 2a in such a way that it cannot rotate relative to the hinge sleeve 2a. In the case of the illustrated arrangement, rib 5a formed on an end facet of the movable disk 5 is held in engagement with groove 2c formed in the inside of the cover hinge sleeve 2a.

Additionally, in the above known hinge device, either the fixed abutment facet 4b of the fixed disk 4 or the movable abutment facet 5b of the movable disk 5 (the fixed abutment facet 4b in the illustrated instance) is provided with a plurality of (three) engaging recesses 6 arranged peripherally at predetermined angular positions N1, N2 and N3 (as defined by the opening angle $\alpha°$ of the cover 2) as seen from FIGS. 9A, 9C and 10, while the other of them is provided with the a plurality of (two) corresponding engaging projections 8 arranged peripherally at predetermined angular positions P1 and P2 and projecting from the movable abutment facet 5b as seen from FIGS. 9B, 9D and 10, the engaging recesses 6 and the corresponding engaging projections 8 being adapted to be urged into mutual engagement by a coil spring 7.

As seen from FIG. 10, the coil spring 7 is housed in a storage cavity 4c having an opening at the side of the fixed disk 4 opposite to the fixed abutment facet 4b. Then, a rod 9 is driven from the outside of the remain body hinge sleeve 1a to run through the coil spring, the fixed disk 4 and the movable disk 5 so that the front end 9a of the rod is tightly received in threaded hole 2e cut into the bottom 2d of the cover hinge sleeve 2a In FIG. 10, reference symbol 9b denotes the head of the rod 9.

As a result of this arrangement, the coil spring 7 resiliently presses the fixed disk 4 against the movable disk 5 and urges the engaging recesses 6 and the corresponding engaging projections 8 into mutual engagement. In other words, the fixed abutment facet 4b is pressed against the movable abutment facet 5b.

Thus, it will be appreciated from FIG. 10 that, as the cover is moved to become open, the movable disk is rotated with the cover hinge sleeve 2a, the engaging projections 8 projecting from the movable abutment facet 5b of the movable disk 5 are moved peripherally and released from the mutual engagement with the corresponding engaging recesses 6 as shown in FIG. 9E. Then, the fixed disk 4 is moved leftward in FIG. 10 against the resilient force of the coil spring 7 so that the front ends of the engaging projections 8 are made to slide peripherally on the fixed abutment facet 4b.

Therefore, referring to FIGS. 9A through 9E, while the engaging projections 8 of the movable disk 5 arranged at angular positions P1, P2 are held in engagement with the corresponding engaging recesses 6 of the fixed disk at angular positions N1, N2 so long as the cover 2 is closed, they come to be engaged respectively with the engaging recesses 6 located at angular positions N3, N1 when the cover is opened by angle $\alpha°$.

The above described known hinge device represents a major technological advancement over known lock means including claw clutches and magnets because the cover is effectively prevented from being inadvertently closed in use or opened when not in use and can be operated to become open and closed in a very simple way.

While the above described known hinge device is highly effective, it requires a cumbersome assembling process. More specifically, as may be seen from FIGS. 8, 9A through 9E and 10, firstly the cover hinge sleeve 2a is fitted to the cover and the groove 2c is made to become engaged with the rib 5a, while the fixed disk 4 is fitted into the main body hinge sleeve 1a so that the guide rib 1c is made to become engaged with the guide groove 4a of the fixed disk 4. Then, the coil spring 7 is put into the fixed disk 4 and the rod 9 is driven to move through the coil spring 7 until the threaded front end 9a of the rod 9 is tightly held into engagement with the corresponding threaded hole 2e bored through the bottom 2d of the cover hinge sleeve 2a so that the coil spring 7 is compressed by the head 9b of the rod 9 to by turn press the fixed abutment facet 4b of the fixed disk 4 against the movable abutment facet 5b of the movable disk 5.

The present invention is intended to eliminate the above cumbersome assembling operation. In an aspect of the present invention, there is provided an engagement assembly with which a rod is made to pass through a second (movable) disk, a sliding disk and a coil spring and become securely and unremovably received by a first (fixed) disk so that the sliding disk is made to resiliently abut the second (movable) disk under the effect of the coil spring, while a pair of spaces are provided between the sliding disk and the remote ends of the sliding grooves of the first (fixed) disk. With this arrangement, the sliding disk is made free from any obstruction when it is axially moved as the second member (cover) is opened or closed relative to the first member (apparatus main body).

The engagement assembly becomes engaged with the first (fixed) disk and the second (movable) disk simply by aligning the first (fixed) disk of the first member (apparatus main body) and the second (movable) disk of the second member (cover) and bringing them into mutual engagement. Then, the second disk is unreleasably held to the second hinge sleeve so that the first member and the second member are made to pivot on each other so as to become closed or open. Thus, the first object of the present invention is to provide a hinge device to be suitably used for a foldable apparatus that can be assembled with utmost ease.

Preferably, the rod running through the second disk, the sliding disk and the coil spring and secured to the first disk is riveted at the front end thereof so as to make the washer abut the front abutment edge of the shank section of the rod and the first disk and hence make the rod itself unreleasable. This arrangement can significantly improve the integrity of the engagement assembly.

Preferably, the second disk is made to have a base plate section and a resilient claw section, of which the resilient claw section includes resilient anti-release claws that become engaged with the second hinge sleeve when the engagement assembly is fitted into the first and second hinge sleeves so as to make the anti-release edge section of the second hinge sleeve to be pinched between the resilient anti-release claws of the resilient claw section and the base plate section. With this arrangement, the engagement assembly would not inadvertently come off from the first and second hinge sleeves.

Still preferably, the engagement assembly is provided at an end thereof with a closure cap that can be fitted to the engagement assembly with a simple operation in order to improve the appearance of the apparatus and prevent particles of dirt from entering the engagement assembly.

SUMMARY OF THE INVENTION

According to the invention, the above object is achieved by providing a hinge device to be used for a foldable apparatus comprising a first member provided with a first hinge sleeve rigidly secured thereto and having a first abutment peripheral edge and a second member provided with a second hinge sleeve having a second abutment peripheral edge slidably held in abutment with the first abutment peripheral edge;

said hinge device comprising a first disk unrotatably fitted into said first hinge sleeve and a second disk unrotatably fitted into said second hinge sleeve;

either the first abutment facet of the first disk or the second abutment facet of the second disk being provided with a plurality of engaging recesses arranged at predetermined angular positions thereof, the other being provided with a plurality of engaging projections adapted to become engaged with the respective engaging recesses under the effect of resilient force of a coil spring, the engagement of said engaging projections and said engaging recesses being switched by an opening or closing motion of the first and second members;

said first disk having a sleeve-shaped main body and a sliding disk axially slidably fitted into the sliding grooves produced by cutting the peripheral wall of the main body; said engaging projections or said engaging recesses being formed on said sliding disk;

said second disk having being provided with resilient ant-release claws;

a rod being driven sequentially into said second disk, said sliding disk and said coil spring and fitted into and unreleasably secured to the sleeve-shaped main body of said first disk so as to form an engagement assembly and make the first abutment facet of the sliding disk 12B to be urged by the coil spring and resiliently abut the second abutment facet of the second disk, thereby producing a pair of spaces having a length not smaller than that of the engaging projections between the sliding disk and the remote ends of the sliding grooves in the engagement assembly;

said resilient anti-release claws of said second disk becoming engaged with said second hinge sleeve by fitting said engagement assembly into said first hinge sleeve and said second hinge sleeve.

Preferably, in a hinge device to be used for a foldable apparatus as set for the above, said rod has a head section, an anti-rotation end section extending from the head, a shank section extending form the end section and a narrow front end section extending from the shank section, said anti-rotation end section being adapted to be engaged with a corresponding anti-rotation hole formed in said second disk, and a washer is arranged around the narrow front end section and held in contact with the sleeve-shaped main body of the first disk so as to be pressed against and secured to the front abutment edge of the shank section by riveting the narrow front end section of the rod.

Preferably, in a hinge device to be used for a foldable apparatus as set forth above, wherein said second disk has a base plate section provided with said engaging recesses or said engaging projections and a resilient claw section projecting from said base plate section and said resilient claw section includes resilient anti-release claws to be engaged with the second hinge sleeve when the engagement assembly is fitted into the first and second hinge sleeves so as to make as the anti-release edge section of the second hinge sleeve to be pinched between the resilient anti-release claws of the resilient claw section and the base plate section.

Still preferably, in a hinge device to be used for a foldable apparatus as set forth above, said engagement assembly is provided at an end thereof with a closure cap having an outer wall section, an inner engaging plate section, an engaging slit formed in the outer wall section and a void formed in the dosure cap and held in communication with the engaging slit so that the closure cat can be fitted to the engagement assembly with a simple operation of putting the washer securely held in abutment to the outer end of the first disk of the engagement assembly into the void by way of the slit and rotating the dosure cap until the latter becomes unreleasbly engaged with the inner engaging plate section.

BRIEF DESCRIPTION OF THE DRAWINGS

FIGS. 1A through 1C are sematic illustrations of an embodiment of hinge device to be used for opening and dosing a foldable apparatus, of which FIG. 1A is an exploded schematic perspective view of the embodiment, FIG. 1B is a schematic cross sectional lateral front view of the embodiment when it is assembled and FIG. 1C is a schematic end view of the second hinge sleeve of the embodiment.

FIGS. 4 Through 4D are schematic illustrations of the second disk of the engagement assembly of the embodiment of FIG. 1A, of which FIG. 4A is a schematic front view and FIG. 4B is a schematic lateral view as viewed from the right side of FIG. 4A, whereas FIG. 4C is a schematic rear view and FIG. 4D is a schematic plan view.

FIGS. 5A through 5D are schematic illustrations of the sliding disk of the engagement assembly of the embodiment of FIG. 1A, of which FIG. 5A is a schematic front view and FIG. 5B a schematic lateral view as viewed from the right side of FIG. 5A, whereas FIG. 5C is a schematic rear view and FIG. 5D is a schematic plan view.

FIGS. 9A through 9E are schematic illustrations of the abutment facet of the fixed disk and that of the movable disk of the hinge device of FIG. 8, of which FIG. 9A is an front view of the abutment facet of the fixed disk, FIG. 9B is a front view of the abutment facet of the movable disk, whereas FIGS. 9C and 9D are a schematic cross sectional views taken respectively along line C—C in FIG. 9A and ling D—D in FIG. 9B and FIG. 9E is a schematic longitudinal cross sectional view of the fixed disk of FIG. 9C and the movable disk of FIG. 9D showing them as they are being released from the mutual engagement.

FIG. 10 is a schematic illustration of a known hinge device mechanism.

DESCRIPTION OF THE PREFERRED EMBODIMENTS

Figure 1:
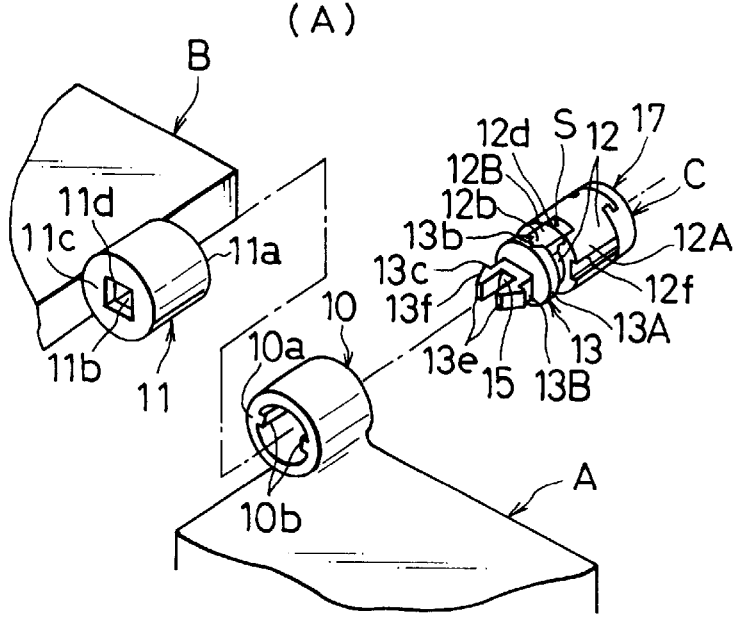
Figure 1:
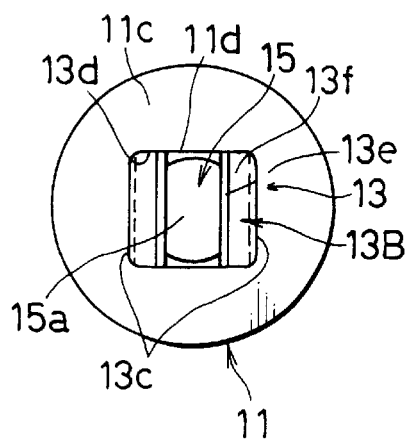
Figure 1:
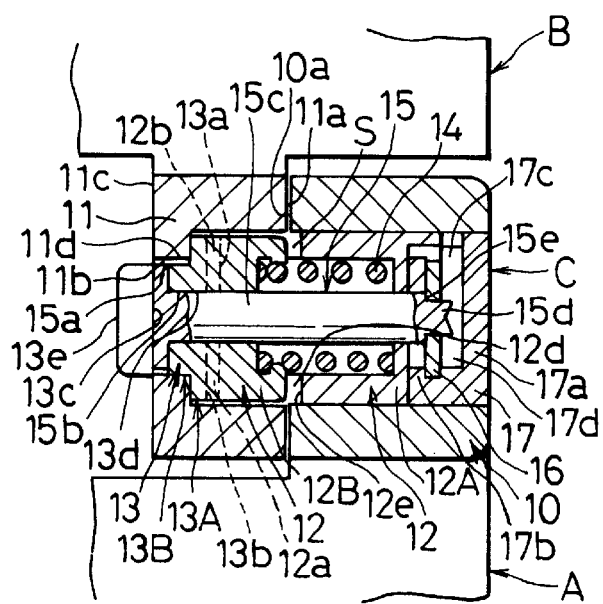
Figure 2:
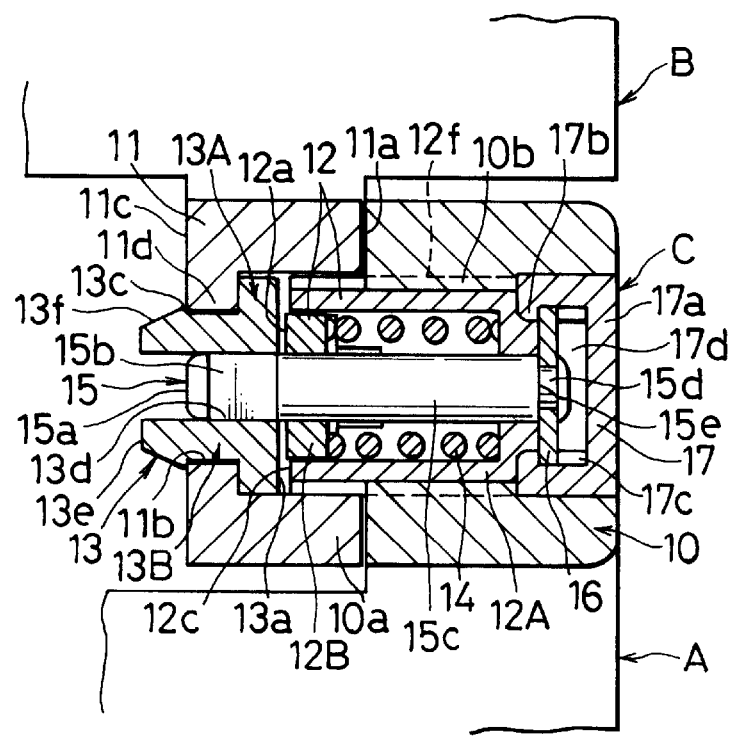
FIG. 2 a schematic cross sectional plan view of embodiment of FIG. 1A when it is assembled.

Now, the present invention will be described in greater detail by referring to FIGS. 1A through 6 the accompanying drawings that illustrate preferred embodiments of the invention. Referring firstly to FIG. 1A, the first member A of a foldable apparatus is provided at an edge thereof with a first hinge sleeve 10, while the second member B of the apparatus is provided at the corresponding edge thereof with a second hinge sleeve 11. The first embodiment of hinge device is formed by the first and second hinge sleeves 10, 11 and an engagement assembly C to be fitted into the fist hinge sleeve 10 and the second hinge sleeve 11. In the illustrated instance, the first member A may be the apparatus main body and the second member B may be the cover adapted to become open and closed relative to the apparatus main body, although no problem arises if the first member A is the cover and the second member B is the apparatus main body.

As in the case of the prior art, the first hinge sleeve 10 and the second hinge sleeve 11 are aligned and the first abutment peripheral edge 10a of the first hinge sleeve 10 and the second abutment peripheral edge 11a of the second hinge sleeve 11 are slidably held in mutual abutment. It will be appreciated from FIGS. 1B, 1C 2 and 3 that, also as in the case of the prior art, the first disk C12 of the engagement assembly C is unrotatably fitted into the first hinge sleeve 10, while the second disk C13 of the engagement assembly C is unrotatably fitted into the second hinge sleeve 11.

Additionally, also as in the case of the above described known hinge device, either the first abutment facet 12a of the first disk 12 or the second abutment facet 13a of the second disk 12 is provided with a plurality of engaging recesses 13b arranged peripherally at predetermined angular positions, while the other of them is provided with the a plurality of corresponding engaging projections 12b arranged peripherally at predetermined angular positions so that the engaging recesses 13b and the corresponding engaging projections 12b are urged into mutual engagement by a coil spring 14 and the engagement of the engaging recesses 13b and the engaging projections 12b is switched as the first and second members A and B are opened or closed relative to each other.

In the above described first embodiment of hinge device according to the invention, the first disk 12 has a sleeve-shaped main body 12A and a sliding disk 12B axially slidably fitted into the sliding grooves 12d produced by cutting the peripheral wall of the main body 12A from an end 12c thereof. The sliding disk 12B is provided with said engaging projections 12b or engaging recesses 13b, whereas the second disk 13 is provided with resilient anti-release claws 13c.

Additionally, a rod 15 is driven to sequentially run through the second disk 13, the sliding disk 12B of the second disk 12 and coil spring 14 and unreleasably fitted into the sleeve-shaped main body 12A of the first disk 12 of the engagement assembly C. Thus, the first abutment facet 12a of the sliding disk 12B is urged by the coil spring 14 to resiliently abut the second abutment facet 13a of the second disk 13.

As a result of the resilient abutment, a pair of spaces S having a length not smaller than that of the engaging projections 12b are formed between the sliding disk 12B and the remote ends 12e of the sliding grooves 12d in the engagement assembly C as shown in FIG.1B.

The sleeve-shaped main body 12A is unrotatably fitted into the first hinge sleeve 10 as a pair of a)dally extending guide ribs 10b formed oppositely on the inner peripheral surface of the first hinge sleeve 10 are engaged with corresponding guide grooves 12f that are also axially extending and formed oppositely on the outer peripheral surface of the sleeve-shaped main body 12A.

Otherwise, the embodiment preferably has a configuration as defined above in terms of the second through fourth aspects of the invention and described in greater detail below.

In the second aspect of the invention, the rod 15 that is driven to sequentially run through the second disk 13, the sliding disk 12B of the second disk 12 and the coil spring 14 and unreleasably fitted into the sleeve-shaped main body 12A of the first disk 12 of the engagement assembly C as described above has a head 15a, an anti-rotation end section 15b extending from the head 15a, a shank section 15c extending form the end section 15b and a narrow front end section 15d extending from the shank section 15c, which shank section 15c is provided at the front end thereof a front abutment edge 15e.

As the anti-rotation end section 15b is received in anti-rotation hole 13d cut through the second disk 13, the second disk 13 comes to rotate with the second hinge sleeve 11 when the second member B is driven to become open or closed. In the illustrated embodiment, both the anti-rotation end section 15b and the anti-rotation hole 13d have a rectangular cross section.

A washer 16 is arranged around the narrow front end section 15d of the rod 15 and held in contact with the remote end of the sleeve-shaped main body 12A of the first disk 12. Thus, as the narrow front end section 15d of the rod 15 is riveted, the washer 16 is pressed against the front abutment edge 15e of the shank section 15c.

In the third aspect of the invention, the second disk 13 has a base plate section 13A provided with the engaging recesses 13b or the engaging projections 12b and a resilient claw section 13B as shown in FIGS. 1A through 3. The resilient claw section 13B has a pair of deformable arms 13e, which deformable arms 13e by turn have respective tapered surfaces 13f and a pair of resilient anti-release claws 13c located at the respective base sections of the tapered surfaces 13f. On the other hand, in the case of the embodiment of FIG. 6, a total of four deformable arms 13e are arranged on the second disk 13 and the resilient claw section 13B has a split cylindrical profile unlike the angular profile of the above described resilient claw section 13B.

In the illustrated embodiment, the second hinge sleeve 11 is provided with a rectangular anti-rotation opening 11b at an end thereof so that, as the second disk 13 of the engagement assembly C is put into the second hinge sleeve 11, the deformable arms 13e having the tapered surfaces 13f of the second disk 13 are radially compressed and made to pass through the anti-release opening 11b. After passing through the anti-release opening 11b, the radially compressed arms 13e are allowed to restore their proper shapes and the resilient anti-release claws 13c are held to the outer surface of the end wall 11c of the second hinge sleeve 11.

Thus, with the illustrated embodiment, an anti-release edge section 11d of the end wall having the anti-rotation opening 11b is pinched by the base plate section 13A and the resilient anti-release claws 13c of the resilient claw section 13B so that the engagement assembly C is reliably housed in the first hinge sleeve 10 and the second hinge sleeve 11a and prevented from coming off.

With the illustrated embodiment, as the second member A is rotated to become open or closed relative to the first member B, the second disk 13 is rotated with the second hinge sleeve 11 as in the case of the prior art so that the engaging recesses 13b and the engaging projections 12b are released from the mutual engagement and the engaging projections 12b are made to slide on the second, abutment facet 13a of the second disk 13. While the sliding disk 12B is made to move rightward in FIG. 1B by this sliding motion, the movement of the sliding disk 12B is not hindered due to the provision of the spaces S so that the second member B is smoothly moved from the closed position to the open position and reliably held to that optical position.

In the fourth aspect of the invention, the outer end of the sleeve-shaped main body 12A of the first disk 12 is covered by a dosure cap 17 to improve the appearance of the apparatus and prevent particles of dirt from entering the engagement assembly C.

Figure 3:
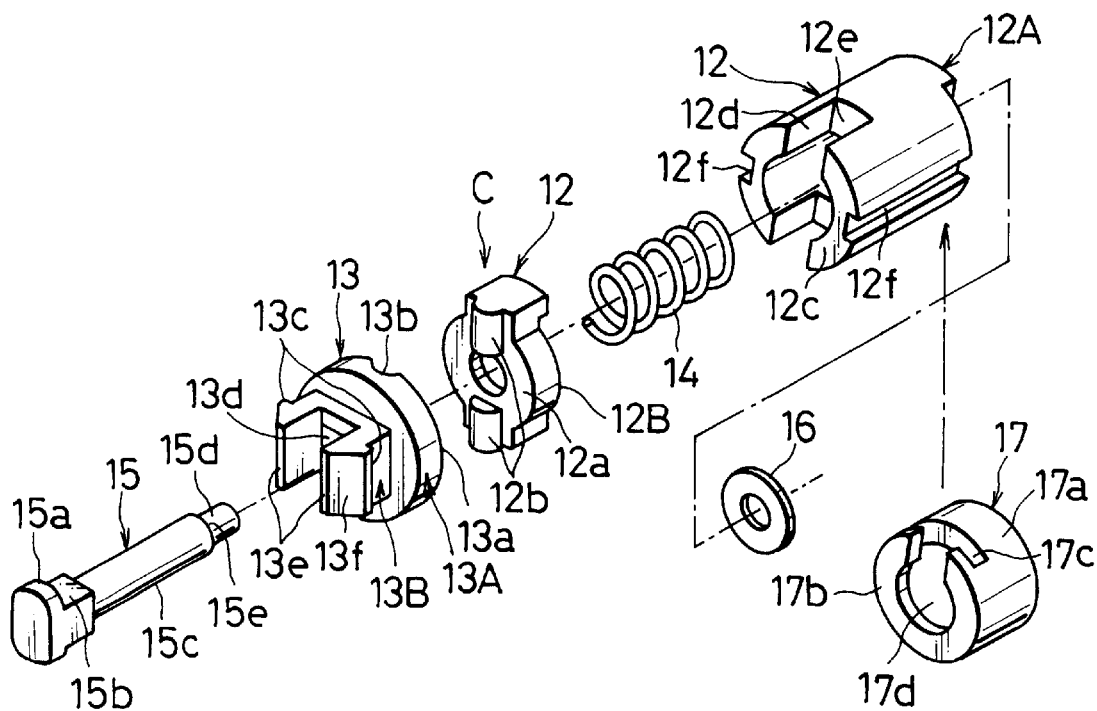
FIG. 3 is an exploded schematic perspective view of the engagement assembly of the embodiment of FIG. 1A.
Figure 4:
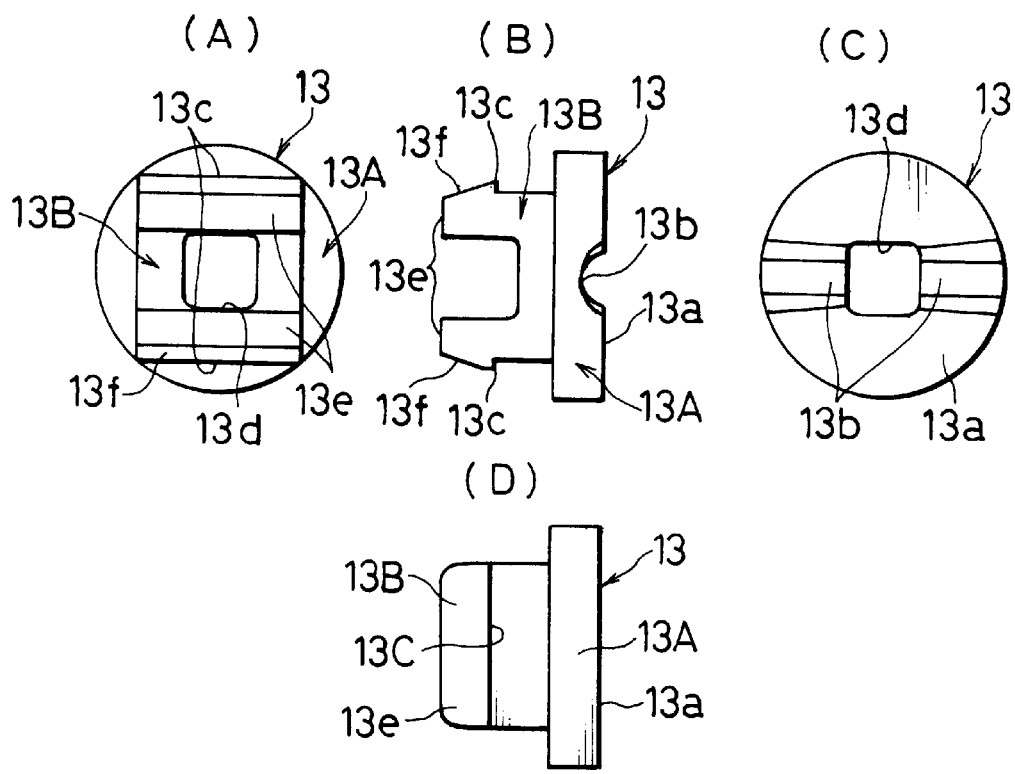
Figure 5:
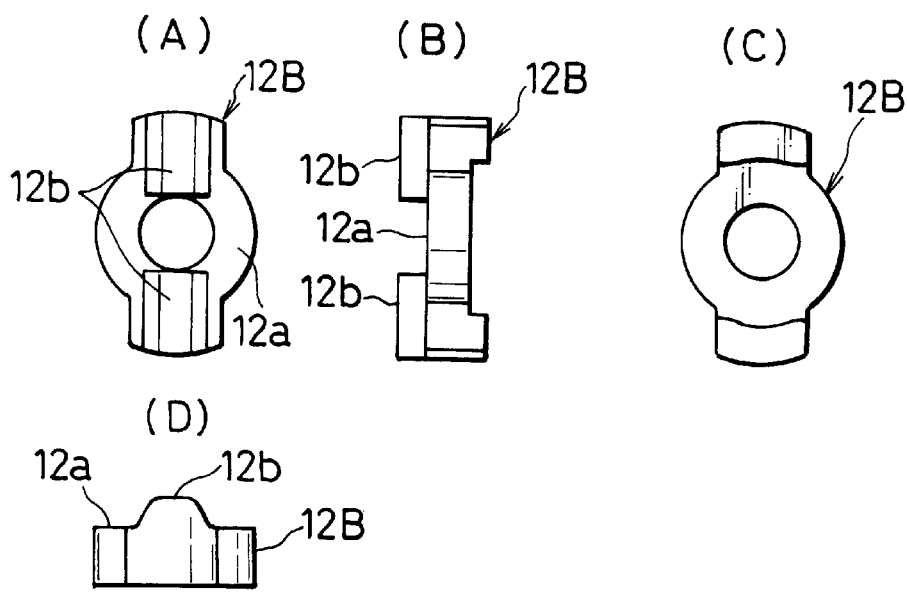
Figure 6:
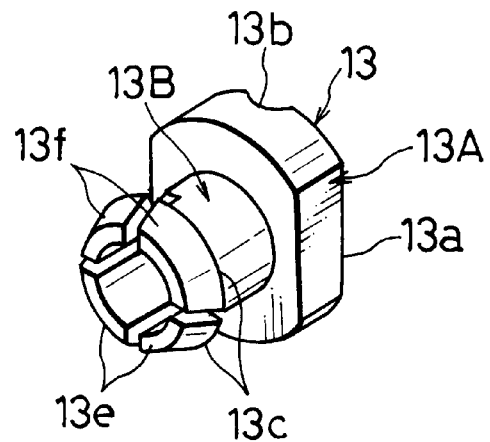
FIG. 6 is schematic perspective view of another embodiment of the second disk of the engagement assembly.
Figure 7:
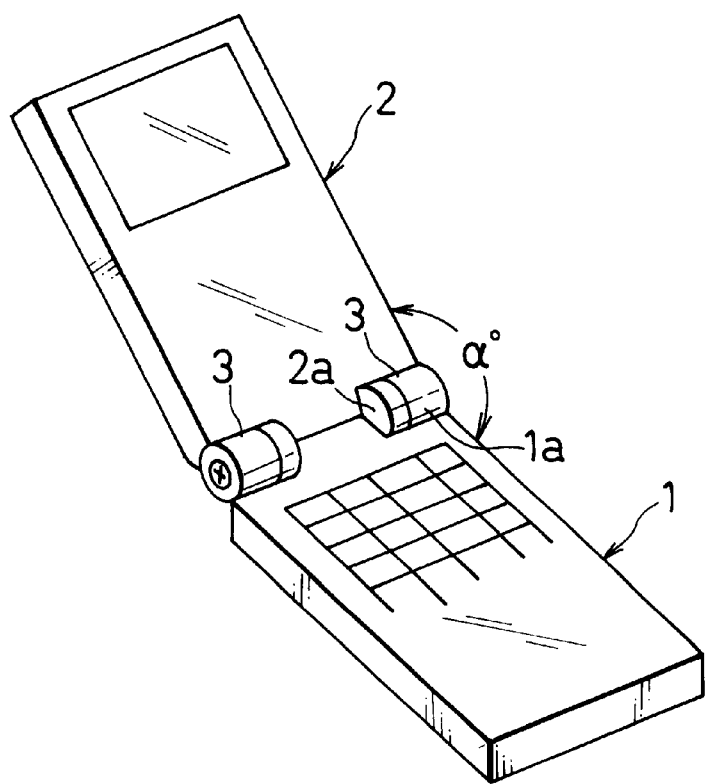
FIG. 7 is a schematic perspective view of a known foldable apparatus when it is opened.
Figure 8:
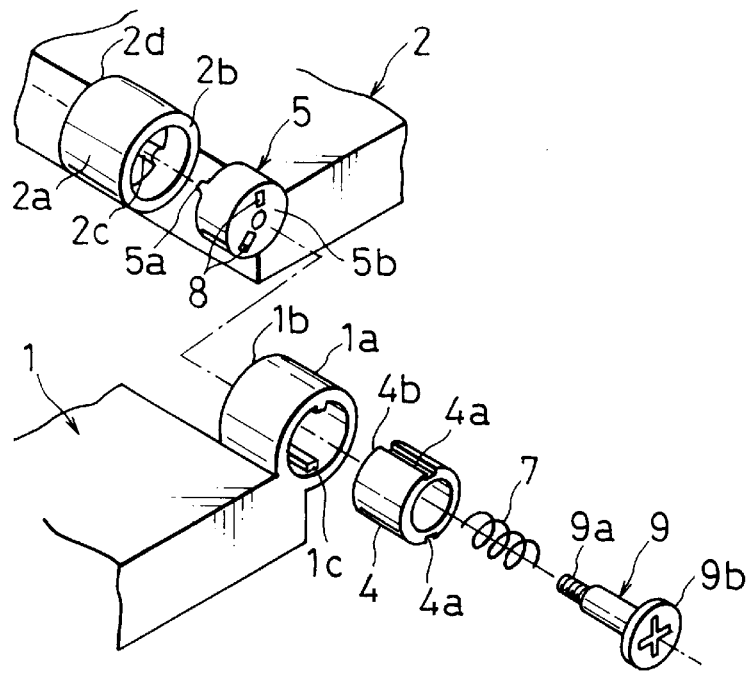
FIG. 8 is an exploded schematic perspective view of the hinge device of the apparatus of FIG. 7.
Figure 9:
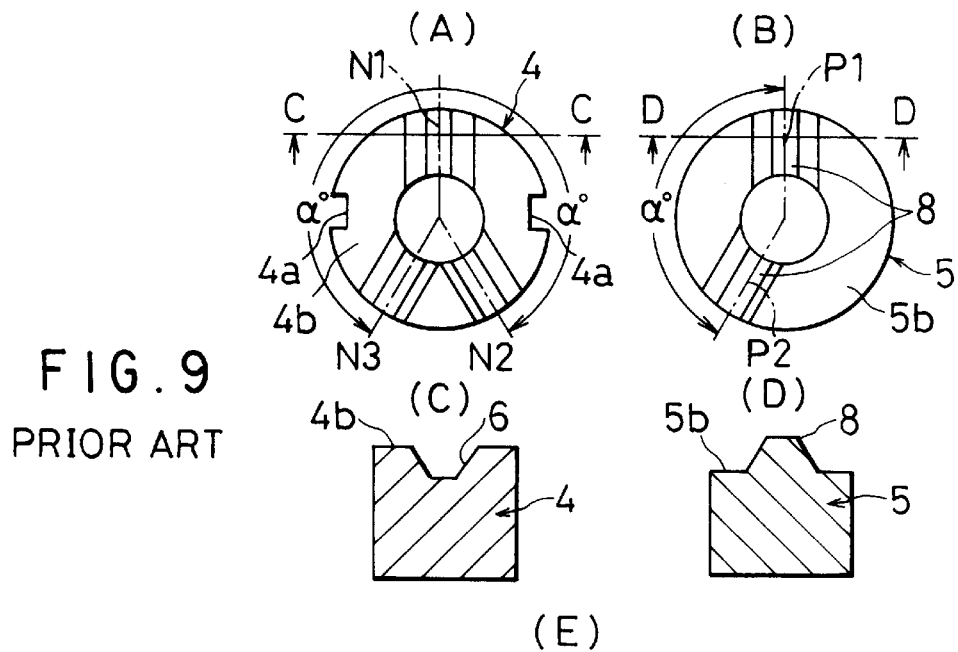
Figure 9:
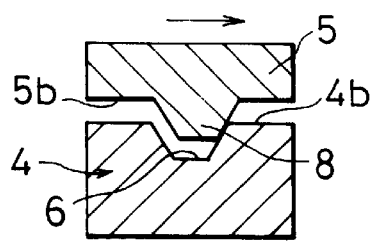

As shown in FIG. 3, the dosure cap 17 has an outer wall section 17a, an inner engaging plate section 17b, an engaging slit 17c formed in the outer wall section 17a and a void 17d formed in the closure cap 17 and held in communication with the engaging slit 17c.

As the washer 16 of the engagement assembly C is put into the void 17d through the engaging slit 17c and then the dosure cap 17 is rotated, the washer 16 becomes unreleasably engaged with the inner engaging plate section 17b.

As described above in detail, since the engagement assembly of a hinge device according to the invention is an integral entity, a foldable apparatus becomes provided with a hinge device simply by fitting the engagement assembly into the first and second hinge sleeves. Thus, it is no longer necessary to carry out a cumbersome and time-consuming operation of assembling a large number of components and the engagement assembly can be secured to the foldable apparatus simply by driving the rod to run through the related components of the engagement assembly and riveting it at an end thereof.

The operation of assembling the engagement assembly is completed when it is pushed into the first and second hinge sleeves. Additionally, since the first disk has a sleeve-shaped main body and a sliding disk that is held in engagement with the main body when it is put into a pair of sliding grooves of the main body in such a way that a pair of spaces are produced within the engagement assembly, the foldable apparatus can be opened and held to a desired angular position with a simple opening operation.

The engagement assembly may additionally be provided with a washer for improving the integrity of the assembly. Additionally, the second disk may be so configured as to include a base plate section having engaging recesses or engaging projections and a resilient claw section that improve the security of the engagement assembly fitted to the foldable apparatus. Still additionally, the engagement assembly may be provided with a closure cap that improves the appearance of the apparatus and prevents particles of dirt from entering the engagement assembly.

What is claimed is:

1. A hinge device to be used for a foldable apparatus comprising a first member provided with a first hinge sleeve rigidly secured thereto and having a first abutment peripheral edge and a second member provided with a second hinge sleeve having a second abutment peripheral edge slidably held in abutment with the first abutment peripheral edge;

said hinge device comprising a first disk unrotatably fitted into said first hinge sleeve and a second disk unrotatably fitted into said second hinge sleeve;

either the first abutment facet of the first disk or the second abutment facet of the second disk being provided with a plurality of engaging recesses arranged at predetermined angular positions thereof; the other being provided with a plurality of engaging projections adapted to become engaged with the respective engaging recesses under the effect of resilient force of a coil spring, the engagement of said engaging projections and said engaging recesses being switched by an opening or closing motion of the first and second members;

said first disk having a sleeve-shaped main body and a sliding disk axially slidably fitted into the sliding grooves produced by cutting the peripheral wall of the main body; said engaging projections or said engaging recesses being formed on said sliding disk;

said second disk being provided with resilient anti-release claws;

a rod being driven sequentially into said second disk, said sliding disk and said coil spring and fitted into and unreleasably secured to the sleeve-shaped main body of said first disk so as to form an engagement assembly and make the first abutment facet of the sliding disk to be urged by the coil spring and resiliently abut the second abutment facet of the second disk, thereby producing a pair of spaces having a length not smaller than that of the engaging projections between the sliding disk and the remote ends of the sliding grooves in the engagement assembly;

said resilient anti-release claws of said second disk becoming engaged with said second hinge sleeve by fitting said engagement assembly into said first hinge sleeve and said second hinge sleeve.

2. A hinge device to be used for a foldable apparatus according to claim 1, wherein said rod has a head section, an anti-rotation end section extending from the head, a shank section extending form the end section and a narrow front end section extending from the shank section, said anti-rotation end section being adapted to be engaged with a corresponding anti-rotation hole formed in said second disk, and a washer is arranged around the narrow front end section and held in contact with the sleeve-shaped main body of the first disk so as to be pressed against and secured to the front abutment edge of the shank section by riveting the narrow front end section of the rod.

3. A hinge device to be used for a foldable apparatus according to claim 1, wherein said second disk has a base plate section provided with said engaging recesses or said engaging projections and a resilient claw section projecting from said base plate section and said resilient claw section includes resilient anti-release claws to be engaged with the second hinge sleeve when the engagement assembly is fitted into the first and second hinge sleeves so as to make as the anti-release edge section of the second hinge sleeve to be pinched between the resilient anti-release claws of the resilient claw section and the base plate section.

4. A hinge device to be used for a foldable apparatus according to claim 1, wherein said engagement assembly is provided at an end thereof with a closure cap having an outer wall section, an inner engaging plate section, an engaging slit formed in the outer wall section and a void formed in the closure cap and held in communication with the engaging slit so that the dosure cat can be fitted to the engagement assembly with a simple operation of putting the washer securely held in abutment to the outer end of the first disk of the engagement assembly into the void by way of the slit and rotating the dosure cap until the latter becomes unreleasbly engaged with the inner engaging plate section.

* * * * *